United States Patent
Gass

(10) Patent No.: US 7,088,819 B2
(45) Date of Patent: Aug. 8, 2006

(54) LOCALIZATION OF AN IP TELECOMMUNICATIONS TERMINAL OVER A LAN

(75) Inventor: Raymond Gass, Bolsenheim (FR)

(73) Assignee: Alcatel, Paris (FR)

( * ) Notice: Subject to any disclaimer, the term of this patent is extended or adjusted under 35 U.S.C. 154(b) by 71 days.

(21) Appl. No.: 10/504,021

(22) PCT Filed: Feb. 20, 2002

(86) PCT No.: PCT/EP02/03706

§ 371 (c)(1),
(2), (4) Date: Aug. 9, 2004

(87) PCT Pub. No.: WO03/071738

PCT Pub. Date: Aug. 28, 2003

(65) Prior Publication Data
US 2005/0141570 A1    Jun. 30, 2005

(51) Int. Cl.
*H04M 1/00* (2006.01)
(52) U.S. Cl. .................. 379/413; 379/413.01; 379/419
(58) Field of Classification Search ................ 379/413, 379/413.03, 419
See application file for complete search history.

(56) References Cited

U.S. PATENT DOCUMENTS

| 5,982,753 A | 11/1999 | Pendleton et al. |
| 6,122,639 A | 9/2000 | Babu et al. |
| 2001/0029536 A1 | 10/2001 | Valentine |

OTHER PUBLICATIONS

DATENBLATT: Catalyst Inline Power Patchfeld 'Online!' Jun. 1, 2001, Cisco Systems, Inernet XP002225865.

*Primary Examiner*—Jefferey F. Harold

(74) *Attorney, Agent, or Firm*—Sughrue Mion, PLLC

(57) ABSTRACT

The present invention relates to a possibility to localize a telecommunications terminal over a local area network. More specifically, the invention provides a method for associating a port number of a powering equipment to which will be connected a telecommunications terminal with some identification characteristics of said telecommunications terminal. Furthermore, it provides a telecommunications terminal to be connected to a local area network while being localized when remotely powered. It provides also a supervisor engine like a server connected to a local area network and collecting identification characteristics of a telecommunications terminal for its localization over said local area network.

13 Claims, 2 Drawing Sheets

LOCALIZATION OF AN IP TELECOMMUNICATIONS TERMINAL OVER A LAN

TECHNICAL FIELD

The present invention relates to a possibility to localize a telecommunications terminal over a local area network. More specifically, the invention provides a method for associating a port number of a powering equipment to which will be connected a telecommunications terminal with some identification characteristics of said telecommunications terminal. Furthermore, it provides a telecommunications terminal to be connected to a local area network while being localized when remotely powered. It provides also a supervisor engine like a server connected to a local area network and collecting identification characteristics of a telecommunications terminal for its localization over said local area network. The invention is based on a priority application PCT/EP 02/03706 which is hereby incorporated by reference.

BACKGROUND OF THE INVENTION

There is a need, in particular for enhanced emergency services (911 in the US, 112 in Europe) to provide a geographical localization information about the device from where an emergency call has been initiated. For devices connected to a Local Area Network LAN, like an Internet Protocol IP based telecommunications terminal e.g. an IP phone, or IP wireless base station, there exists specific protocol like Simple Network Management Protocol SNMP to centralize some information about that devices. Usually, some data collection mechanism about all the network devices will run on some management. An update of any change of some status of these devices on the network can be obtained. The type of information a device can provide to the management will depend on the Management Information Bases MIB that are supported by that device.

A device supports a MIB if the device is capable of supplying the type of information defined in the objects specified in the MIB. Most devices can provide the type information defined in the objects specified in certain standard MIBs, known as MIB I and MIB II. The format and layout of MIB II is specified in Request for Comments RFC 1213. Additional standard MIBs have been defined for information types not covered in MIB I and MIB II, and new MIBs are being developed on an ongoing basis. However, support for these standard MIBs varies from device to device. A device may only support a subset of their own proprietary MIBs, and many devices operate in more than one mode.

In U.S. Pat. No. 6,122,639 is disclosed a method of collecting information about a device in a network for storage in a database. It is based on a regular mapping of some device type identifier to a plurality of information sets associated with that identifier. It implies a transfer of a non negligible amount of data particularly in nowadays LAN to which a high number of devices like IP telecommunications terminal will be connected.

In U.S. Pat. No. 5,982,753 is disclosed a test instrument for testing a LAN. This test instrument once connected to that LAN, will conduct a segment discovery test in which the network devices are analyzed to detect local hosts, switches, routers, bridges and other devices, and further determine addressing information such as IP addresses, MAC addresses. A data base of these addresses of the various devices can be compiled. The type of reports chosen depend on the contents of the set of available MIBs as well as the particular ports selected for analysis. A switch typically has ports as listed according to the bridge MIB and also has interfaces which correspond to ports but may also include the backplane and SNMP agents. If the bridge MIB is available from the switch, the test instrument can obtain a list of MAC addresses of devices attached to any port. These MAC addresses are then matched by port against the data base to obtain the report of IP and MAC addresses and device names by port.

But this method cannot be applied for emergency application concerning telecommunications terminals like IP phones since MAC address does not provide any information about the physical port usually RJ45 plug to which they are connected to that LAN. And a localization of a device will only be possible if to each MAC addresses of a device connected to the LAN can be affected with certainty a corresponding valid port number. This problem appears to be crucial in this context since the user of telecommunications terminals to be connected to a LAN will be even encourage to relocate its device according to its need anywhere over the LAN infrastructure. Such advantage of the use of e.g. an IP phone will be to much restricted if it is contingent by some specific registration each time such telecommunications terminal is relocated over the LAN.

SUMMARY OF THE INVENTION

It is an object of the present invention to allow a localization of a telecommunications terminal connected on a LAN at any time and unambiguously so to be of use for an emergency application.

This object is attained by a method for a localization of a telecommunications terminal over a local area network according to claim 1. Furthermore, it is attained by a telecommunications terminal to be connected to a LAN according to the claim 9. And it is also attained by a supervisor engine connected to a LAN according to claim 10.

It is taken advantage of the possibility to remotely power any telecommunications terminal connected to a LAN via a powering equipment like a power patch panel. Such a typical Ethernet connection of a telecommunications terminal to a LAN is usually based on the use of half of the 8 wires of a line L separated on two unshielded twisted pair of wires giving one pair for transmission Tx, one for reception Rx. The transmission pair is dedicated to send packets of data over the Ethernet connection; the reception pair receives packets of data over the Ethernet connection. The four other wires are usually let unused.

A remote powering of that telecommunications terminal will be performed via center taps using these two pairs of wires of the line L as conductors of a phantom circuit. The power will be supplied by the powering equipment like a power patch panel to which will be connected said telecommunications terminal to the LAN. But at first, the line L of that telecommunications terminal has to be plug in using e.g. some RJ45 plug into a port of the powering equipment. Then, some recognition of the power class of the terminal will have to be performed by that powering equipment. And only then, a remote powering of that terminal will be able to take place.

This remote powering can be advantageously utilized for the transmission of some identification characteristics of the telecommunications terminal to some supervisor engine of that LAN. On that supervisor engine will run an application performing some association of some identification characteristics like the MAC address of each of the telecommunications terminal with the respective port of the powering equipment via which these telecommunications terminals will be connected to the LAN. This association can then be let available to some telecommunications emergency application for a localization of a telecommunications terminal when activating an emergency call.

BRIEF DESCRIPTION OF THE DRAWINGS

Further advantageous features of the invention will now be explained in more details with reference to the accompanying drawings, in which.

DETAILED DESCRIPTION OF PREFERRED EMBODIMENTS

Figure 1:
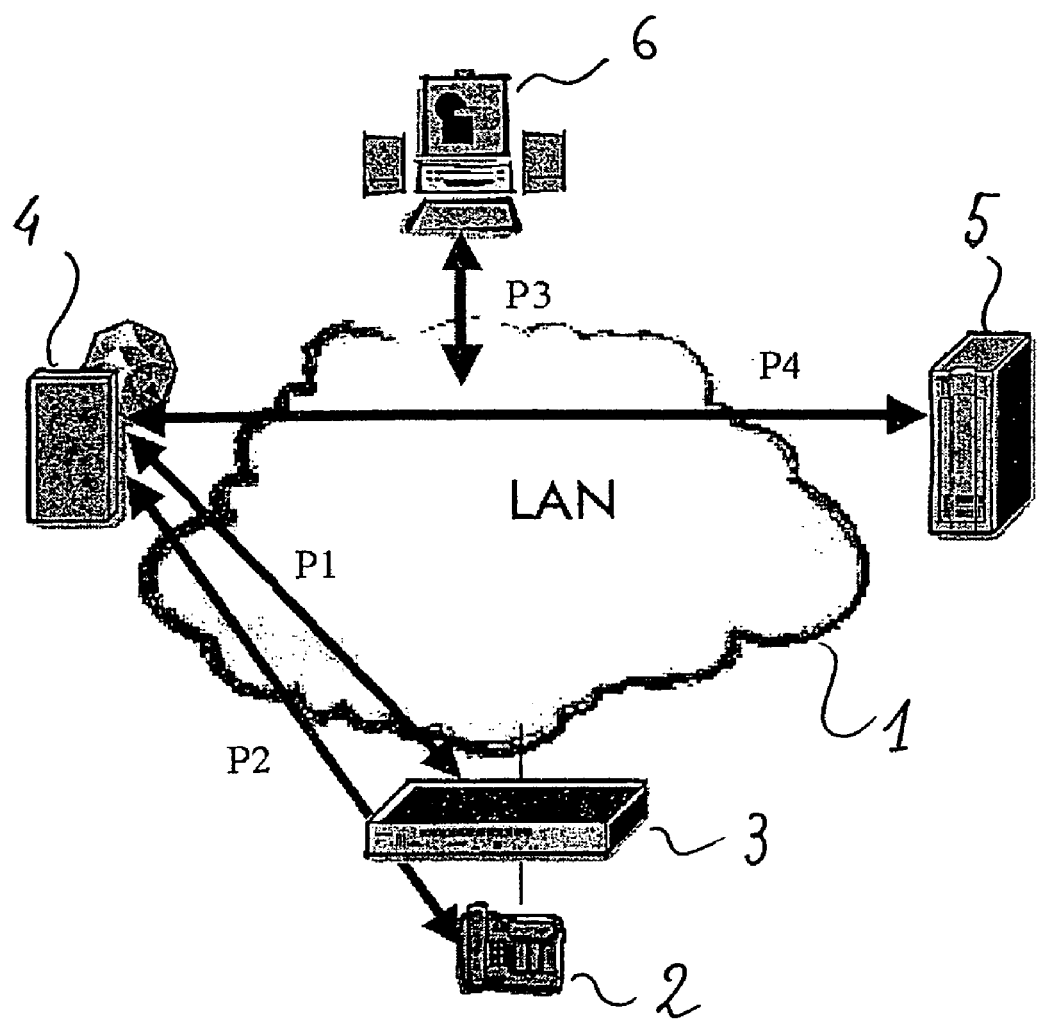
FIG. 1 is a schematic view of a local area network.

On FIG. 1 is shown a LAN 1 to which is connected a telecommunications terminal like an IP phone 2 via a powering equipment e.g. a power patch panel 3 which may be part of a switch since being possibly inserted in it. A supervisor engine like a Private Branch exchange PBX 4 is also connected to said LAN and devoted to supervise among other a correct remote powering of the different telecommunications terminals using the powering equipment. Some emergency application 6 not necessarily running on the same supervisor engine is able to collect the necessary information out of the PBX 4.

When a new telecommunications terminal like the IP-phone 2 is connected to the power patch panel 3 then an initialization is started. It is based on an appropriate scheduling using the available signaling paths as shown on FIG. 1. Three signaling paths are available:

SNMP between a telephony application on the PBX 4 (and thus with the emergency application 5—additional path P4) and the power patch panel 3 (or the remote power function included in a switch) using path P1;

Signaling between the IP phone 2 and the telephony application on the PABX 4 over TCP/IP using path P2;

a third path P3 between a computer 6 and the LAN to which it is connected for management purposes as used in cited prior art.

An initialization of an IP phone following its plug in in the wall plug or after a restart of some installation (or part of it) will include the following main steps:

recognition and remote powering;
initialization dialog between the IP phone and the telephony application.

Figure 2:
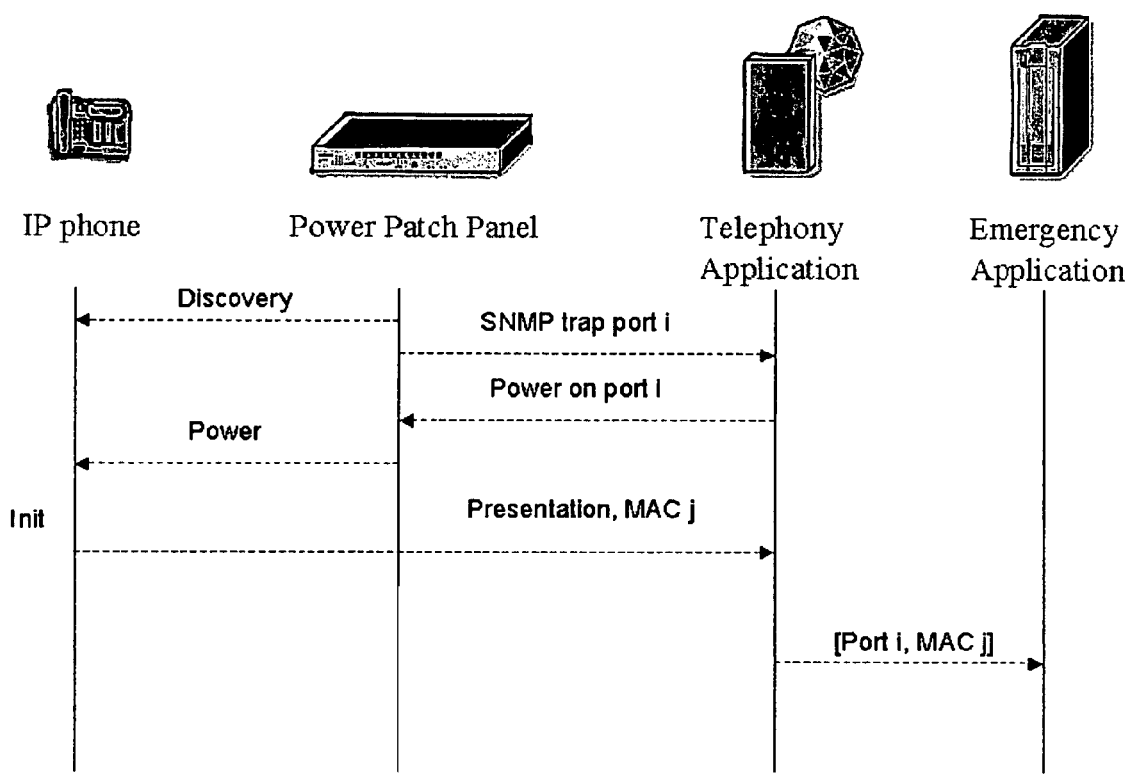
FIG. 2 is a flow diagram showing the different steps of the method according to the present invention.

On FIG. 2 is shown a flow diagram with the different steps.

At first, an initialization procedure is started on said power patch panel of the IP phone, said initialization comprising possibly a recognition of the power class of said IP phone.

The result of this initialization procedure is transmitted towards the telephony application at the supervisor engine (PBX) preferably in SNMP. It comprises the port number of the power patch panel to which is connected the IP phone. If needed, the power class of said IP phone may also be transmitted to the telephony application.

The telephony application performs some controls on the power patch panel preferably in SNMP.

This will initiate a remote powering of the IP phone.

The starting of this remote powering will activate on the IP phone some internal initialization followed by an attempt to reach the telephony application over P2. This will be usually performed using some TCP/IP message. One of such messages will include its MAC address.

Once the telephony application received the port number as well as the MAC address, it is able to perform some association between both numbers.

This association is let available to the telecommunications emergency application which can use it for a localization of that IP phone.

In the situation when several telecommunications terminals like IP phones will be plug in at the same time or some reset is performed over the LAN affecting a plurality of telecommunications terminals, then the supervisor engine will receive different events containing the different port numbers corresponding to each telecommunications terminal. The supervisor engine (here the telephony application on the PBX 4) will start an initialization of a remote powering of each of these telecommunications terminals one after the others via at least one powering equipment. It is conceivable that the supervisor engine controls several powering equipment while to each of them are connected several telecommunications terminals. The supervisor engine will not start with a new initialization before at least receiving some identification characteristics of the telecommunications terminal to which a remote powering will be started at last. In such a way, an association between a port number and a MAC address of a specific telecommunications terminal will be possible unambiguously. This is of extreme importance when let available to the telecommunications emergency application since a localization of a telecommunications terminal must be possible without a mistake.

According to the present invention, a telecommunications terminal like e.g. an IP phone or an IP wireless base station after a start of its remote powering, will have to transmit its identification characteristic like its MAC and optionally IP addresses to the supervisor engine i.e. the telephony application running on the PBX 4. This dialogue may occur using TCP/IP via path P2.

To fulfill a correct localization of a telecommunications terminal connected to the LAN, some supplementary information may also be let available to the emergency application. Indeed, for a correct geographical localization of a telecommunications terminal, it may be of importance to have a cabling map which gives the physical location of the wall plug behind each port number of each power patch panel. On top of that, it may be necessary to be able to access into some directory providing names related to E.164 addresses (a scheme to assign a number to a phone line, especially for ISDN), IP addresses, MAC addresses as a help for the association allowing an unambiguous geographical localization of the telecommunications terminals.

The invention claimed is:

1. A method for a localization of a telecommunications terminal to be connected to a local area network, the method comprising:

starting an initialization procedure on a powering equipment via which said telecommunications terminal will be connected to said local area network, said initialization procedure comprising recognition of a power class of said telecommunications terminal;

transmitting an event to a supervisor engine on said local area network including a port number of said powering equipment which is connected to said telecommunications terminal;

initializing of a remote powering of said telecommunications terminal by said supervisor engine via said powering equipment;

transmitting identification characteristics of said telecommunications terminal towards said supervisor engine;

associating of the port number from the powering equipment, which is connected to said telecommunications terminal, with said identification characteristics of said telecommunications terminal by said supervisor engine.

2. The method according to claim 1, wherein said identification characteristics of said telecommunications terminal includes its media access control address.

3. The method according to claim 1, wherein said supervisor engine receives different events related with different port numbers which are connected to different telecommunications terminals, and said supervisor engine initializes a remote powering of each of these telecommunications terminals one at a time, starting with a new initialization after at least receiving some identification characteristics of the telecommunications terminal to which an initialization will be started at last.

4. The method according to claim 1, wherein an initialization procedure starts on said powering equipment each time a new telecommunications terminal is connected to a port of said powering equipment.

5. The method according to claim 1, wherein an event is transmitted to said supervisor engine for resetting said association between said port number and said identification characteristics of said telecommunications terminal following a disconnection of a telecommunications terminal from its port on said powering equipment, and said port number is freed for a new association.

6. The method according to claim 1, wherein said telecommunications terminal is an Internet Protocol based telecommunications terminal.

7. The method according to claim 1, wherein said association of said port number with said identification characteristics of said telecommunications terminal is usable by a telecommunications emergency application running on said supervisor engine.

8. The method according to claim 1, further comprising transmitting the power class of said telecommunications terminal.

9. A telecommunications terminal connected to a local area network via a powering equipment allowing said telecommunications terminal to be remotely powered, wherein said telecommunications terminal transmits its identification characteristics to a supervisor engine connected to said local area network which allows a localization of said telecommunications terminal by said supervisor engine.

10. The telecommunications terminal according to claim 9, wherein the identification characteristics are associated with the port number from the powering equipment connecting the telecommunication terminal with the local area network, and, wherein said port number is transmitted to the supervisor engine when the remote powering is initialized by the powering equipment.

11. A supervisor engine connected to a local area network which is connected to a plurality of different telecommunications terminals via a plurality of powering equipment wherein said supervisor engine further collects an identification characteristic of one of the plurality of telecommunications terminals for associating it with the port number from the powering equipment connected to said telecommunications terminal after initializing a remote powering of one of the plurality of said telecommunications terminals.

12. The supervisor engine according to claim 11, wherein said association of said port number with said identification characteristic is usable by a telecommunications emergency application running on said supervisor engine for a localization of said telecommunications terminal.

13. The supervisor engine according to claim 11, wherein said port number is collected when the remote powering is initialized.

* * * * *